United States Patent
Larsson et al.

(10) Patent No.: US 9,198,104 B2
(45) Date of Patent: Nov. 24, 2015

(54) NETWORK NODE, USER NODE AND METHODS FOR POWER BOOSTING DPCCH

(71) Applicant: Telefonaktiebolaget L M Ericsson (Publ), Stockholm (SE)

(72) Inventors: Erik Larsson, Uppsala (SE); Michael Samuel Bebawy, San Jose, CA (US); Peter Von Wrycza, Stockholm (SE); Yi-Pin Eric Wang, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 192 days.

(21) Appl. No.: 13/983,714

(22) PCT Filed: Jun. 26, 2013

(86) PCT No.: PCT/SE2013/050773
§ 371 (c)(1),
(2) Date: Aug. 5, 2013

(87) PCT Pub. No.: WO2014/070067
PCT Pub. Date: May 8, 2014

(65) Prior Publication Data
US 2014/0126534 A1    May 8, 2014

Related U.S. Application Data

(60) Provisional application No. 61/721,579, filed on Nov. 2, 2012.

(51) Int. Cl.
*H04W 36/18* (2009.01)
*H04W 52/16* (2009.01)
*H04W 36/00* (2009.01)

(52) U.S. Cl.
CPC .............. *H04W 36/18* (2013.01); *H04W 52/16* (2013.01); *H04W 36/0088* (2013.01)

(58) Field of Classification Search
CPC ............... H04W 36/18–36/22; H04L 25/0204; H04L 25/0224; H04L 1/1812
USPC .......................................... 370/252, 331–338
See application file for complete search history.

(56) References Cited

U.S. PATENT DOCUMENTS 8,094,701 B2 * 1/2012 Cozzo ........................... 375/147
2008/0254819 A1 * 10/2008 Niwano et al. ................ 455/522
(Continued)

FOREIGN PATENT DOCUMENTS

WO    2009096876 A2    8/2009
WO    2009118635 A2    10/2009

OTHER PUBLICATIONS

International Search Report and Written Opinion dated Sep. 16, 2013 for International Application No. PCT/SE2013/050773, International Filing Date: Jun. 26, 2013 consisting of 11-pages.
(Continued)

*Primary Examiner* — Afsar M Qureshi
(74) *Attorney, Agent, or Firm* — Christopher & Weisberg, P.A.

(57) ABSTRACT

A method in a network node for enhancing a channel estimate based on a Dedicated Physical Control Channel, DPCCH, between a user node and the network node is provided. The DPCCH has a first power. The network node receives (501) the DPCCH. The first power of the DPCCH is boosted with additional power, resulting in a second power. The network node then obtains (502) a channel estimate based on the DPCCH comprising the second power. As soon as said channel estimate is obtained, the network node removes (503) the additional power from the DPCCH based channel estimate.

20 Claims, 11 Drawing Sheets

(56) References Cited

U.S. PATENT DOCUMENTS

2010/0273520 A1* 10/2010 Pelletier et al. ............... 455/522
2011/0038305 A1* 2/2011 Mella et al. ................... 370/328

OTHER PUBLICATIONS

3GPP TR 25.213 version 11.3.0 Release 11-3rd Generation Partnership Project; Technical Specification Group Radio Access Network; Spreading and Modulation (FDD) consisting of 43-pages.

Nokia Siemens Networks, "MIMO with 64QAM for HSUPA" 3GPP TSG RAN Meeting #54, RP-111642, Berlin, Germany, Dec. 6-9, 2011 (consisting of 4-pages).

Nokia Siemens Networks, "MIMO with 64QAM for HSUPA" 3GPP TSG RAN Meeting #54, RP-111642, Berlin, Germany, Dec. 6-9, 2011 (consisting of 5-pages).

Nokia Siemens Networks, "MIMO with 64QAM for HSUPA" 3GPP TSG RAN Meeting #54, RP-111642, Berlin, Germany, Dec. 6-9, 2011 (consisting of 6-pages).

3GPP TS 25.211 V11.1.0 (Sep. 2009) 3rd Generation Partnership Project; Technical Specification Group Radio Access Network; Physical channels and mapping of transport channels onto physical channels (FDD) (Release 11) Sep. 2009 consisting of 59-pages.

3GPP TS 25.214 V 11.3.0 (Sep. 2012) 3rd Generation Partnership Project; Technical Specification Group Radio Access Network; Physical layer procedures (FDD) (Release 11) Sep. 2012 consisting of 111-pages.

3GPP TS 25.331 V11.3.0 (Sep. 2012) 3rd Generation Partnership Project; Technical Specification Group Radio Access Network; Radio Resource Control (RRC); Protocol specification (Release 11) Sep. 2012 consisting of 1981-pages.

* cited by examiner

NETWORK NODE, USER NODE AND METHODS FOR POWER BOOSTING DPCCH

TECHNICAL FIELD

Embodiments herein relate to a network node, a user node and methods therein. In particular, it relates to enhancing or enabling enhancement of a channel estimate based on a DPCCH between the user node and the network node.

BACKGROUND

Wireless devices for communication such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B node", Base Transceiver Station (BTS), or AP (Access Point), depending on the technology and terminology used. The base stations may be of different classes such as e.g. macro NodeB, home NodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

Universal Mobile Telecommunications System (UMTS) is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for terminals. The 3GPP has undertaken to evolve further the UTRAN and GSM based radio access network technologies. A Radio Network Controller (or RNC) is a governing element in the UMTS radio access network and is responsible for controlling the Node Bs that are connected to it. The RNC carries out radio resource management, some of the mobility management functions and is the point where encryption is done before user data is sent to and from the mobile. The RNC connects to a Circuit Switched Core Network through Media Gateway (MGW) and to a SGSN (Serving GPRS Support Node) in a Packet Switched Core Network.

Soft HandOver (SHO), also referred to as macro diversity, and fast closed-loop power control are essential features of WCDMA and Enhanced UL (EUL). Soft handover is a feature in which a UE is simultaneously connected to two or more cells. This means that data is received simultaneously in multiple cells, which provides diversity gains. Typically it is distinguished between soft and softer handover, where softer handover refers to the case when the SHO cells belong to the same site, e.g. NodeB, whereas in soft handover the cells can belong to different sites, e.g. NodeBs. FIG. 1 illustrates SHO operation for a traditional High Speed Packet Access (HSPA) deployment scenario with two nodes, a macro node of a serving cell and a macro node of a non-serving cell, having a similar transmit power level. The main difference between Macro, Micro, Pico nodes is the output power, and the more output power the larger coverage area. A Macro has typically 20 W or 40 W, i.e. 43 dBm or 46 dBm or a power in-between or similar. Ideally, a UE moving from the serving cell towards the non-serving cell will enter a SHO region at point A. This may be referred to as Event 1a. At point B also referred to as Event 1d, a serving cell change will occur, i.e. a non-serving cell becomes a serving cell and vice versa. At point C also referred to as Event 1b, the UE will leave the SHO region. It is the Radio Network Controller (RNC) that is in control of reconfigurations, which implies rather long delays for e.g. performing a cell change. During SHO, the UE is power-controlled by the best uplink cell. Since the nodes have roughly the same transmit power in FIG. 1, the optimal DL and UL cell borders will coincide, i.e. the path loss from the UE to the two nodes will be equal at point B. Hence, in an ideal setting and from a static, such as long-term fading, point of view, the serving cell will always correspond to the best uplink. However, in practice, due to imperfections such as e.g. reconfiguration delays, and fast fading, the UE may be power controlled by the non-serving cell during SHO. In such case there may be problems to receive essential control channel information in the serving cell due to the weaker link between the serving cell and UE. For example, High Speed Dedicated Physical Control Channel (HS-DPCCH) and scheduling information need to be received in the serving cell. Possible remedies include increasing gain factors by means of Radio Resource Control (RRC) signaling, utilize repetition or rely on HARQ. The power of each UL physical channel is set relative the HS-DPCCH power by means of its gain factor, i.e. P_channel_X=gain_factor_channel_x$^2$×P_DPCCH. Further details related to gain factors is described in 3GPP 25.213 version 11.3.0, and 25.214 version 11.3.0. Note though that possible imbalances between UL and DL are mainly caused by fast fading in a traditional deployment, whereas for other scenarios, e.g. heterogeneous networks, other factors make the imbalance more pronounced.

During the 3GPP RAN#56 plenary meeting, a Study Item (SI) was initiated on UMTS Heterogeneous Networks, 'RAN Plenary (RP)-111642, "Work Item (WI): MIMO with 64QAM for HSUPA", Nokia Siemens Networks. Deployment of Low-Power Nodes (LPNs) in the heterogeneous networks is seen as a powerful tool to meet the ever-increasing demand for mobile broadband services. A LPN may correspond, for example, to a Remote Radio Unit (RRU), a pico base station or a micro base station, allowing expanding the network capacity in a cost-efficient way. RRU is a radio transceiver capable of handling multiple UEs simultaneously. Typically, several RRUs are connected to and controlled by a single central controller. A network comprising traditional macro nodes such as macro NodeBs, and LPNs is referred to as a heterogeneous network. Two examples of use-cases for heterogeneous network deployment that may be envisioned are coverage holes and capacity enhancement for localized traffic hotspots.

Since the LPNs and macro NodeBs in a heterogeneous network have different transmit powers, the UL and DL cell borders will not necessarily coincide. An example of this is when a UE has a smaller path loss to the LPN, while the strongest received power is from the macro NodeB. Path loss is the reduction in power density of an electromagnetic wave as it propagates through space. Path loss is a major component in the analysis and design of a link budget of a telecommunication system.

In such a scenario, the UL is better served by the LPN while the DL is provided by the serving macro node. This is shown in FIG. 2 which illustrates SHO operation for HSPA in a heterogeneous deployment. The region between the equal path loss border and equal downlink received power, e.g. Common Pilot Channel (CPICH) receive power, border is referred to as imbalance region. In this imbalance region, some fundamental problems may be encountered. For example, a UE in position A would have the macro node as the serving cell, but be power controlled towards the LPN. A UE in SHO is power controlled by several cells, e.g. all cells in the active set. All cells compares the received UE DPCCH power with a SIR target, where the SIR target is set by the RNC. If the received power is larger than the target then the cell orders the UE to reduce its power and vice versa if the received power is less than the target. The UE combines the power control commands from the multiple cells into a single command. It is the strongest link that dictates the power control, i.e. it is enough that one cell orders the UE to decrease its power, while all other cells orders UP for the UE to decrease the power. Due to the UL-DL imbalance the UL towards the serving macro node will be very weak, which means that important control information, such as scheduling information or HS-DPCCH, may not be reliably decoded in the serving cell. Furthermore, a UE in position B will have the macro node as the serving cell, and also be power controlled towards the macro. Due to the UL-DL imbalance, the UE will cause excessive interference in the LPN node. Furthermore, in this scenario the benefits of macro node offloading towards the LPN cannot fully be utilized. One way of improving these problems is to utilize available RNC based cell selection offset parameters. For example, by tuning Cell Individual Offset (CIO) parameter the handover border can be shifted towards the optimal UL border. Handover is based on DL CPICH power. If the UE discovers that the CPICH power from a non-serving cell is stronger than the CPICH from the current serving cell, then the UE will inform the network about this, also referred to as event 1c. The CIO may be used to offset this handover measurement. The CPICH power from one cell, e.g. the LPN, may appear to be stronger or weaker than it actually is, thereby triggering handover earlier or later. There are network parameters that may be used to tune the measurements used in UE event procedures based on the scenario, e.g. Macro-to-Macro, Macro-to-LPN, LPN-to-LPN, etc. The effect of these adjustments is illustrated in FIG. 3. FIG. 3 illustrates SHO operation for HSPA in a heterogeneous deployment with range extension.

These adjustments are beneficial from a system performance point of view, but some difficulties remain:

Scenario 1—A UE in position A may experience a poor DL from the non-serving LPN. This may complicate a reliable detection of UL related DL channels by the UE, e.g. E-HICH and F-DPCH from the LPN.

Scenario 2—A UE in position B has the macro node as serving cell but is in general power controlled towards the LPN. Hence, the uplink signal towards the serving cell may be weak and thereby complicate a reliable reception of control channel information at the serving cell.

Scenario 3—A UE in position C is served by the LPN. However, its DL may be poor and thereby complicate a reliable reception of control information, such as High Speed-Shared Control Channel (HS-SCCH) and Enhanced Absolute Grant Channel (E-AGCH).

Scenario 4—A UE in position D may experience a poor UL towards the non-serving macro cell and thereby complicate the uplink reception at the macro cell.

To maximize the potential gains provided by range extension, the problems associated with the different scenarios above need to be solved. This will allow not only to optimize the system performance, but also to improve the link quality for UEs experiencing severe degradation in UL or DL.

SUMMARY

It is therefore an object of embodiments herein to provide a way of improving the performance and robustness in a wireless radio network. According to some embodiments, methods in network nodes and/or user nodes are provided for ensuring sufficient channel estimation quality by boosting the DPCCH power.

According to a first aspect of embodiments herein, the object is achieved by a method in a network node for enhancing a channel estimate based on a Dedicated Physical Control Channel, DPCCH, between a user node and the network node. The DPCCH has a first power. The network node receives the DPCCH. The first power of the DPCCH is boosted with additional power, resulting in a second power. The network node then obtaining a channel estimate based on the DPCCH comprising the second power. As soon as said channel estimate is obtained, the network node removes the additional power from the DPCCH based channel estimate.

In accordance with one embodiment of this aspect, the DPCCH is multiplied with a first amplitude gain factor resulting in the first power, and the DPCCH is boosted with additional power by one of being multiplied with an additional amplitude gain factor to the DPCCH resulting in the second power and the first gain factor being modified to further include the additional amplitude gain factor resulting in the second power. The removing the additional power from the DPCCH based channel estimate is performed by removing the additional amplitude gain factor from the DPCCH resulting in the first power.

In accordance with one embodiment of this aspect, an estimate of any other physical channel than the DPCCH is obtained by multiplying said channel estimate with said physical channel's gain factor.

In accordance with one embodiment of this aspect, one of all the symbols of the DPCCH are boosted with additional power and only pilot symbols of the DPCCH are boosted with the additional power.

According to a second aspect of embodiments herein, the object is achieved by a method in a user node for enabling enhancement of a channel estimate based on a Dedicated Physical Control Channel, DPCCH, between the user node and a network node. The DPCCH has a first power. The user node boosts the first power of the DPCCH with additional power, resulting in a second power, while keeping the power of other physical channels relative the first power. This enables the network node to obtain a channel estimate based on the DPCCH comprising the second power.

In accordance with one embodiment of this aspect, the DPCCH is multiplied with a first amplitude gain factor resulting in the first power, and the boosting of the first power of the DPCCH is performed by one of: multiplying an additional amplitude gain factor to the DPCCH resulting in the second power and modifying the first gain factor to further include the additional amplitude gain factor resulting in the second power.

In accordance with one embodiment of this aspect, a criteria for when to perform the boosting of the first power of the DPCCH comprises at least one of: whenever enabled by higher-layers, when receiving High Speed Shared Control CHannel orders, whenever entering soft handover, whenever entering soft handover involving nodes of different transmit powers, whenever a quality of any control channel is below a threshold, and whenever an estimated Signal-to-Interference Ratio, SIR, is below a SIR target for a period of time.

According to a third aspect of embodiments herein, the object is achieved by a network node for enhancing a channel estimate based on a Dedicated Physical Control Channel, DPCCH, between a user node and the network node 110. The DPCCH is configured to have a first power. The network node comprises a communication circuitry configured to receive the DPCCH. The first power of the DPCCH is boosted with additional power, resulting in a second power. The network node further comprises a processing unit configured to obtain a channel estimate based on the DPCCH comprising the second power. The processing unit is further configured to remove the additional power from the DPCCH based channel estimate as soon as said channel estimate is obtained.

In accordance with one embodiment of this aspect, the DPCCH is multiplied with a first amplitude gain factor resulting in the first power. The DPCCH is boosted with additional power by one of being multiplied with an additional amplitude gain factor to the DPCCH resulting in the second power and the first gain factor being modified to further include the additional amplitude gain factor resulting in the second power. The processing unit is further configured to remove the additional power from the DPCCH based channel estimate by removing the additional amplitude gain factor from the DPCCH resulting in the first power.

In accordance with one embodiment of this aspect, the processing unit is further configured to obtain an estimate of any other physical channel than the DPCCH by multiplying said channel estimate with said physical channel's gain factor.

In accordance with one embodiment of this aspect, one of all the symbols of the DPCCH are boosted with additional power and only pilot symbols of the DPCCH are boosted with the additional power.

According to a fourth aspect of embodiments herein, the object is achieved by a user node for enabling enhancement of a channel estimate based on a Dedicated Physical Control Channel, DPCCH, between the user node and a network node. The DPCCH is configured to have a first power. The user node comprises a processing unit configured to boost the first power of the DPCCH with additional power, resulting in a second power, while keeping the power of other physical channels relative the first power. This enables the network node to obtain a channel estimate based on the DPCCH comprising the second power.

In accordance with one embodiment of this aspect, the DPCCH is multiplied with a first amplitude gain factor resulting in the first power. The processing unit is further configured to boost the first power of the DPCCH with additional power by one of: multiplying an additional amplitude gain factor to the DPCCH resulting in the second power and modifying the first gain factor to further include the additional amplitude gain factor resulting in the second power.

In accordance with one embodiment of this aspect, a criteria for when to boost the first power of the DPCCH comprises at least one of: whenever enabled by higher-layers, when receiving High Speed Shared Control CHannel orders, whenever entering soft handover, whenever entering soft handover involving nodes of different transmit powers, whenever a quality of any control channel is below a threshold, and whenever an estimated Signal-to-Interference Ratio, SIR, is below a SIR target for a period of time.

Since the DPCCH is boosted with additional power, the quality of the channel estimate is improved, and since the additional power is removed the from the DPCCH based channel estimate as soon as said channel estimate is obtained, the DPCCH quality is improved without affecting the processing of other channels, which powers are set relative to the DPCCH. This implies that the performance and robustness in a wireless radio network has been improved.

BRIEF DESCRIPTION OF THE DRAWINGS

Examples of embodiments herein are described in more detail with reference to attached drawings in which.

DETAILED DESCRIPTION

As part of developing embodiments herein, some problems will first be identified and discussed.

This embodiments herein addresses scenarios where a user node is connected to several nodes with different link quality, and important control information needs to be received by the network node from the user node over a potentially weak link. For example, in a WCDMA system, a user node in SHO is effectively power-controlled by the best uplink cell. If the best UL is a non-serving cell, one problem is how to ensure that important control information can be reliably received at the serving macro base station. The problem of weak links becomes particularly pronounced whenever the imbalance between the best UL and DL may become large, such as for heterogeneous networks or multi-flow operation. Multi-flow is a recent standardized feature for HSPA that mainly tries to improve the cell edge user experience. There exist many flavours of multi-flow, but in short it may be said that multi-flow enables the possibility to simultaneously schedule independent data streams to a UE from different cells and/or different frequencies, which may be compared with DL Multiple Input Multiple Output (MIMO) where different data streams are scheduled from the same cell on a single frequency.

Figure 1:
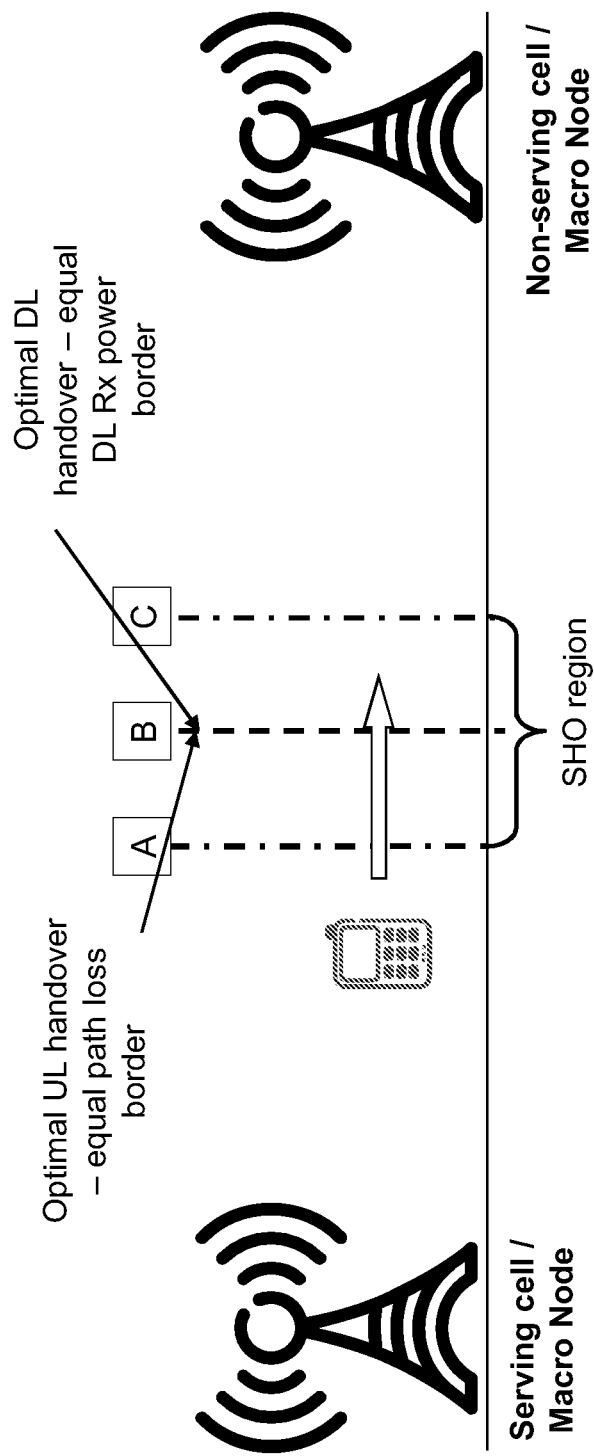
FIG. 1 is a schematic block diagram illustrating SHO operation for HSPA in a macro deployment according to prior art.
Figure 2:
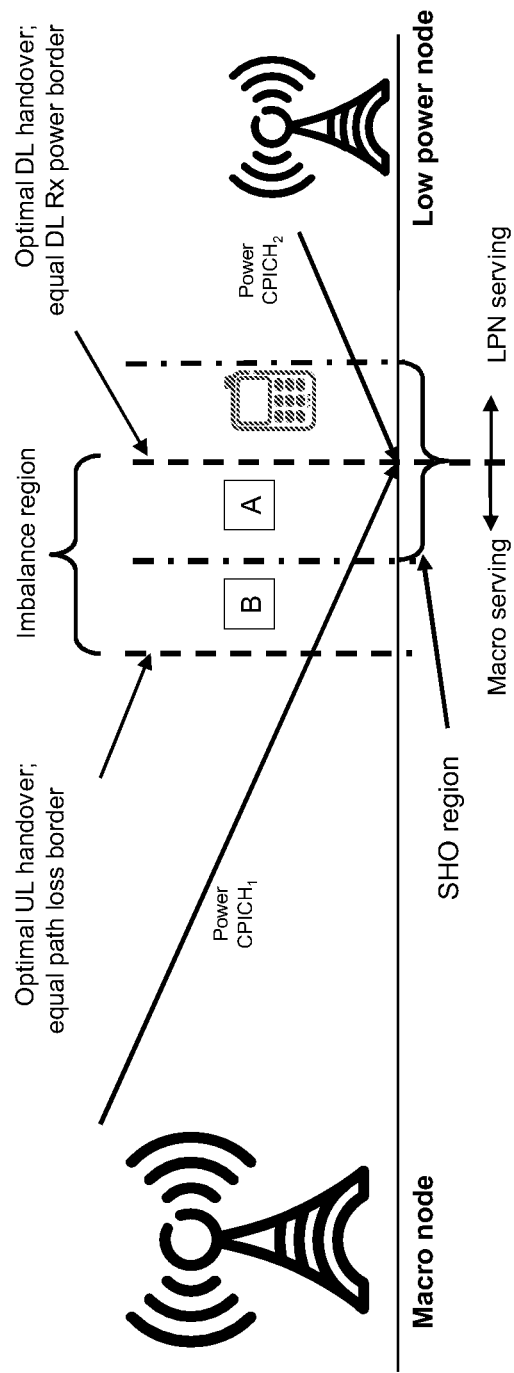
FIG. 2 is a schematic block diagram illustrating SHO operation for HSPA in a heterogeneous deployment according to prior art.
Figure 3:
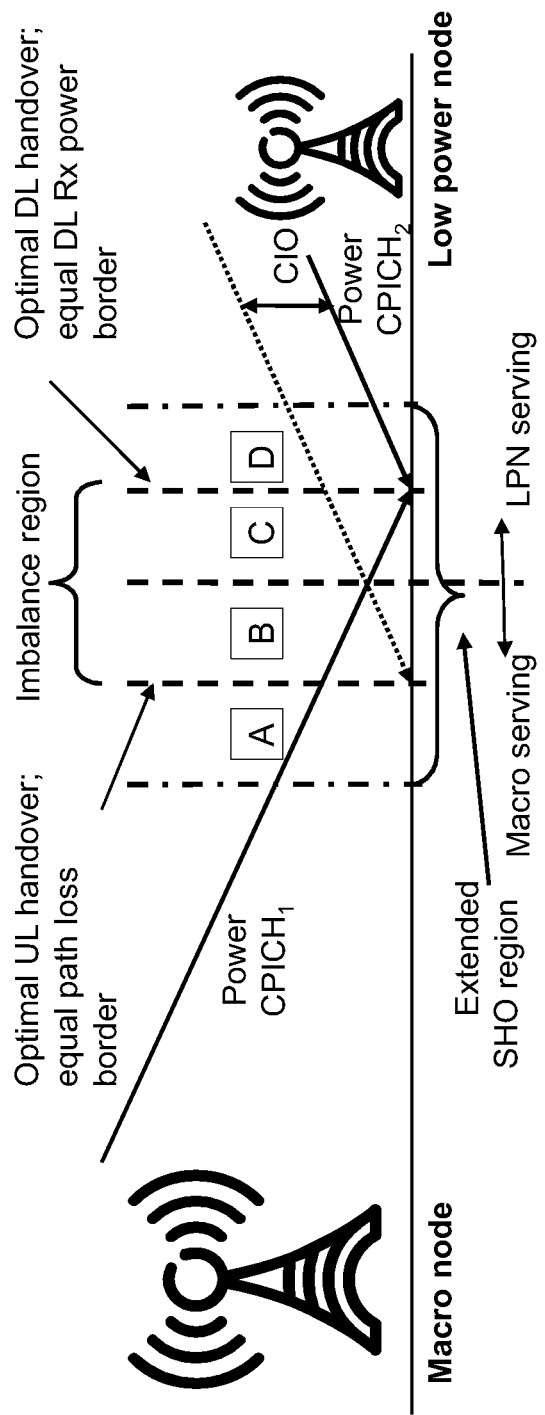
FIG. 3 is a schematic block diagram illustrating SHO operation for HSPA in a heterogeneous deployment with range extension according to prior art.
Figure 4:
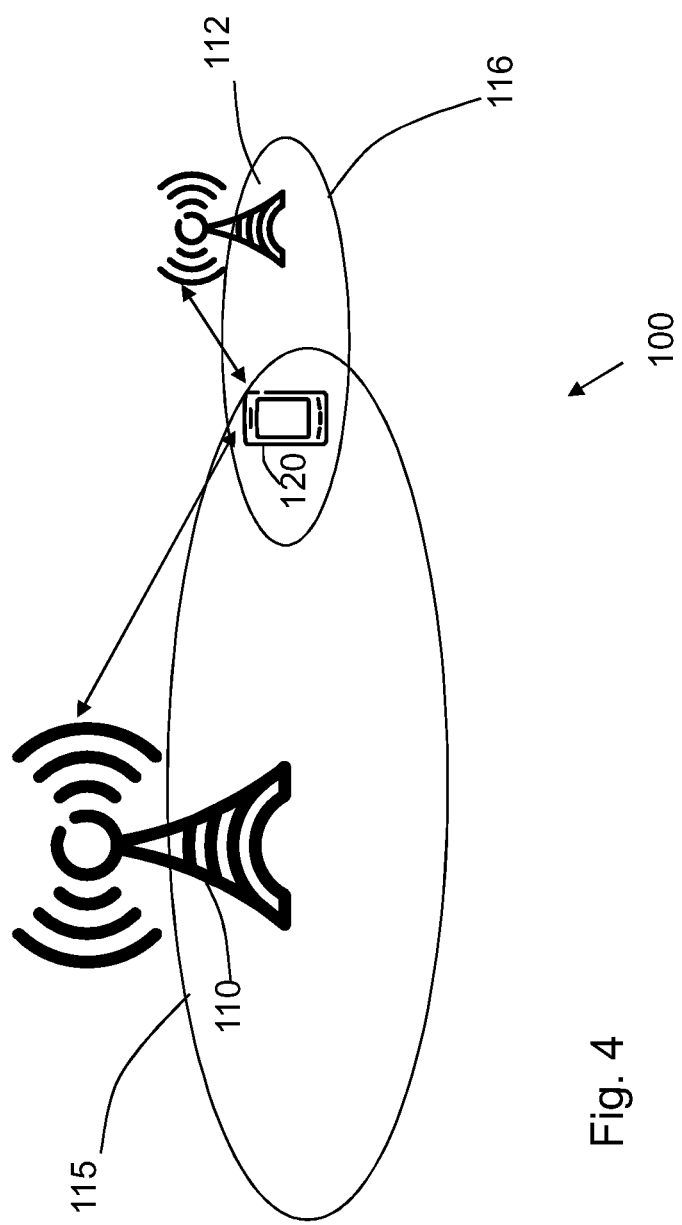
FIG. 4 is a schematic block diagram illustrating embodiments herein.

FIG. 4 depicts a wireless radio network 100 in which embodiments herein may be implemented. The wireless radio network 100 is a wireless communication network such as a WCDMA network. The wireless radio network 100 may be a heterogeneous network or a homogeneous network.

The wireless radio network 100 comprises a plurality of network nodes whereof two network nodes, a first network node which is referred to as the network node 110 and a second network node 112 are depicted in FIG. 4. The network node 110 and the second network node 112 may each be any one out of a radio base station such as e.g. a NodeB, a macro node, a LPN or any other network node capable to serve a user equipment or a user node in a wireless radio network. The network node 110 according to embodiments herein may in other scenarios be an RNC. The network node 110 may when being a base station serve a first cell 115. The second network node 112 may when being a base station serve a second cell 116. According to an example scenario depicted in FIG. 4, the network node 110 is a macro node and the second network node 112 is an LPN, but it may as well be the other way around. In most examples herein, the network node 110 is the serving macro cell.

A number of user nodes are located in the wireless radio network 100. In the example scenario of FIG. 4, only one user node is shown, a user node 120 is located in the wireless radio network 100. The user node 120 may be a UE, a mobile station, a telemetry node, a communication node in a car, or any type of node communicating in a radio network system.

As part of developing embodiments herein, a problem will be identified and discussed.

For the wireless radio network 100 to be stable and well-performing it is required that important UL control information sent from the user node 120 is reliably received in the serving network node 110. Examples of such information are DL related Acknowledge (ACK)/Not Acknowledge (NACK) information carried on the HS-DPCCH, EUL control information carried on the Enhanced Dedicated Channel (E-DCH) Dedicated Physical Control Channel (E-DPCCH) and in-band scheduling information conveyed via the E-DCH Dedicated Physical Data Channel (E-DPDCH). A sufficient quality of the channel estimate is essential in order to be able to detect and decode any information. Since pilots are carried on the DPCCH it is important to make sure that the DPCCH is reliably received.

In the scenario in FIG. 4, the network node 110 is the serving NodeB.

One solution to the problem would be to increase a Signal-to-Interference Ratio (SIR) target, or setting a minimum SIR target during SHO with links of different quality. This would mean that all UL channels are power boosted, resulting in an increased reception performance. However, this would also mean that too much power is allocated to the UL channels, and in particular the E-DPDCH, whenever UL information is not needed in the serving cell. Furthermore this would lead to excessive interference in some nodes such as the second network node 110. Therefore an alternative approach would be to only boost the essential channels when needed.

The UL Transmission (Tx) processing chain essentially comprises the following steps: Note that the order of some of these steps may be inter-changed. 1) coding of information, 2) modulation, 3) channelization code spreading, 4) gain factor multiplication, 5) multiplexing of channels, 6) scrambling, 7) power normalization and 8) transmission power update. Step 4, 7 and 8 are of interest for embodiments described in this document. In step 4 each physical channel is multiplied by an associated amplitude gain factor, which may be referred to as beta-value and denoted $\beta_x$, where x is different for different physical channels, i.e. each physical channel type has its own beta-value. The beta-value may be fixed, signaled via higher-layers, or vary dynamically typically depending on the data rate.

How the beta-values for each physical channel is set is described in 3GPP 25.214 version 11.3.0, but basically there is a delta-value signalled by higher layers, which is translated into an amplitude value which is then used when calculating the gain factor, beta-value. The higher-layer signalling is described in 3GPP 25.331 version 11.3.0, RRC spec, where different information elements are stated. For example in 3GPP 10.3.6.98 the information elements related to E-DPCCH are given, and one of them is 'E-DPCCH/DPCCH power offset' which is the Delta value used by layer-1 when calculating the beta-factor for E-DPCCH. For DPCCH the associated beta value depends on a Transport Format Combination (TFC) if DPDCH is configured, and equals one if no DPDCH is configured; see Section 4.2.1.1 in 3GPP TS 25.213 version 11.3.0. Section 5.1.2.5C of 3GPP TS 25.214 version 11.3.0 describes how to set beta_c when no DPDCH is configured (beta_c=1), and described in section 5.1.2.5.2 or 5.1.2.5.3 of 3GPP TS 25.214 version 11.3.0 if at least one DPDCH is configured. Step 7 and 8 normalizes all channels, explicitly or implicitly, to ensure that the output power of DPCCH follows that dictated by the power control procedure and apply certain maximum/minimum transmission power constraint that need to be satisfied; see 3GPP TS 25.214.

It should be noticed that the power of all channels is set relative to the DPCCH power since the power control procedure operates on DPCCH. This implies that once the channel estimate is calculated using the DPCCH pilots, an estimate of any physical channel is obtained simply by multiplying with the associated gain factor.

One alternative to enhance the channel estimates would be to boost the DPCCH. This has, however, some drawbacks. For example, the DPCCH is used in many legacy procedures, such as power control. Furthermore the power of all other channels is set relative to DPCCH. Thus, boosting DPCCH may end up boosting all other channels. Hence, a way to boost the DPCCH is proposed with minimal impact on legacy procedures, and no impact on the power setting of other channels.

According to embodiments herein, DPCCH power is boosted in order to ensure sufficient channel estimation quality e.g. when the communication link is weak. Since UL pilots are carried on the DPCCH, boosting of only this channel ensures better channel estimation quality.

Figure 5:
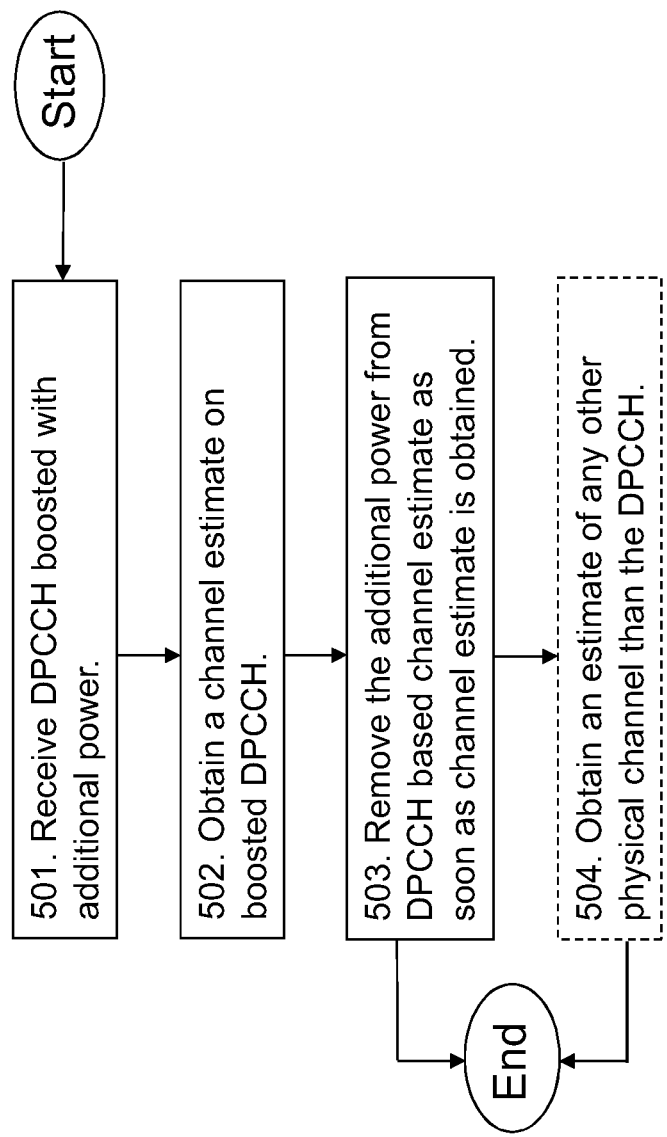
FIG. 5 is. a flowchart depicting embodiments of a method in a network node.

Example embodiments of the network node 110 for enhancing a channel estimate based on a DPCCH between the user node 120 and the network node 110, will now be described with reference to a flowchart depicted in FIG. 5. The DPCCH has a first power. An inner-loop power control procedure will adjust the DPCCH power. This power is referred to as first power. All other channels set their power relative this first power via their gain values.

The method comprises the following actions, which actions may be taken in any suitable order. Dashed lines of some boxes in FIG. 5 indicate that this action is not mandatory.

The method is described in a general way first, here as seen from the view of the network node 110, then as seen from the view of the user node 120. The methods will then be described more in detail below.

Action 501

The network node 110 receives the DPCCH. In order to ensure sufficient channel estimation quality e.g. when the communication link is weak, the first power of the DPCCH is boosted with additional power, resulting in a second power.

For example, all the symbols of the DPCCH may be boosted with additional power, or only pilot symbols of the DPCCH may be boosted with the additional power.

According to some embodiments, the boosting have been performed by the user node 120, which will be described more in detail below.

Action 502

A general channel estimate is required between the user node 120 and the network node 110, and information in the DPCCH is used to get this estimate. Thus, the network node 110 obtains a channel estimate based on the DPCCH comprising the second power.

Action 503

The DPCCH based channel estimate may be used for receiver processing demodulation, detection, etc., and the power of this estimate should correspond to the 'un-boosted' DPCCH. Therefore, the network node 110 then removes the additional power from the DPCCH based channel estimate as soon as said channel estimate is obtained.

In some embodiments, the DPCCH is multiplied with a first amplitude gain factor resulting in the first power, and the DPCCH is boosted with additional power by being multiplied with an additional amplitude gain factor to the DPCCH resulting in the second power. Or as an alternative by the first gain factor being modified to further include the additional amplitude gain factor resulting in the second power. In these embodiments the removing of the additional power from the DPCCH based channel estimate is performed by removing the additional amplitude gain factor from the DPCCH resulting in the first power.

Action 504

The network node 110 may obtain an estimate of any other physical channel than the DPCCH by multiplying said channel estimate with said physical channel's gain factor.

Figure 6:
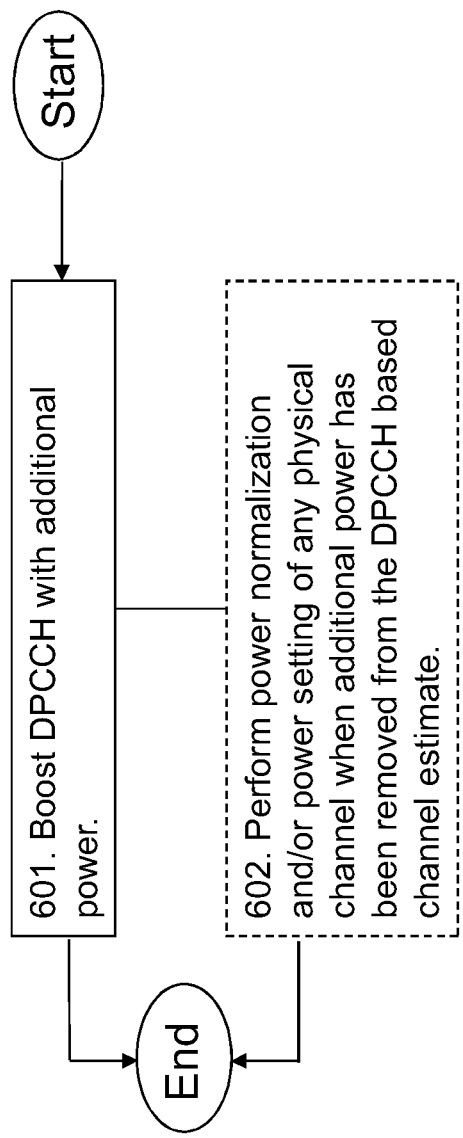
FIG. 6 is a flowchart depicting embodiments of a method in a user node.

Example embodiments of a method in the user node 120 for enabling enhancement of a channel estimate based on a DPCCH between the user node 120 and the network node 110, will now be described with reference to a flowchart depicted in FIG. 6. As mentioned above, the DPCCH has a first power.

The method will now be described in a general way as seen from the view of the user node 120. The method comprises the following actions, which actions may be taken in any suitable order. Dashed lines of some boxes in FIG. 6 indicate that this action is not mandatory.

Action 601 in order to ensure sufficient channel estimation quality e.g. when the communication link is weak, the user node 120 boosts the first power of the DPCCH with additional power, resulting in a second power, while the user node 120 keeps the power of other physical channels relative the first power. This enables the network node 110 to obtain a channel estimate based on the DPCCH comprising the second power. The boosting procedure affects some user node procedures such as e.g. E-DCH Transport Format Combination (E-TFC) selection since boosting affects the total power budget of the user node 120.

In some embodiments, the DPCCH is multiplied with a first amplitude gain factor resulting in the first power. In these embodiments the boosting of the first power of the DPCCH may be performed by multiplying an additional amplitude gain factor to the DPCCH resulting in the second power. Or as an alternative, by modifying the first gain factor to further include the additional amplitude gain factor resulting in the second power.

A criteria for when to perform the boosting of the first power of the DPCCH may comprise any one or more out of:

Whenever enabled by higher-layers, e.g. via a message from the wireless radio network 100 such as from a RNC, or when receiving High Speed Shared Control CHannel orders, Whenever the user node 120 entering soft handover, Whenever the user node 120 entering soft handover involving nodes of different transmit powers, Whenever a quality of any control channel is below a threshold. This is typically measured by the network node 110 such as the serving NodeB, but it may also be done by the user node 120 and then reported to the network node 110.

Whenever an estimated Signal-to-Interference Ratio, SIR, is below a SIR target for a period of time. This may be estimated by the network node 110.

Note that a combination of several of the criteria may be used as well as any single criteria.

Action 602

In some embodiments, the user node 120:

Sets the power of all other channels relative the first power of DPCCH

Boosts DPCCH with additional power

Checks power constraints. For example, performs possible power normalization of channels according to the first power of the DPCCH, ensure that the additional DPCCH power is accounted for in all relevant power constraints, e.g. an E-TFC selection, or the power scaling procedure.

The methods described in a general way above will now be described more in detail. The description below may refer to any embodiment above.

This relates to Action 501 and 601 above. According to some embodiments herein, the user node 120 boosts the first power of the DPCCH with additional power by multiplying the DPCCH with an additional amplitude gain factor, which may be denoted $\beta_{c,boost}$, which is not taken into consideration in the power normalization step 7 as described above. This means that the output power of the DPCCH not necessarily follows that dictated by the power control procedure. The impact of this additional gain factor is then removed in the network node as soon as the channel estimate is computed, i.e. before any additional processing is done. See Action 503 above. Hence, the boosting of DPCCH is only for enhancing the channel estimate and will not affect, for example, the DPCCH Signal-to-Noise Ratio (SNR) or Signal-to-noise-and-interference ratio (SINR).

Figure 7:
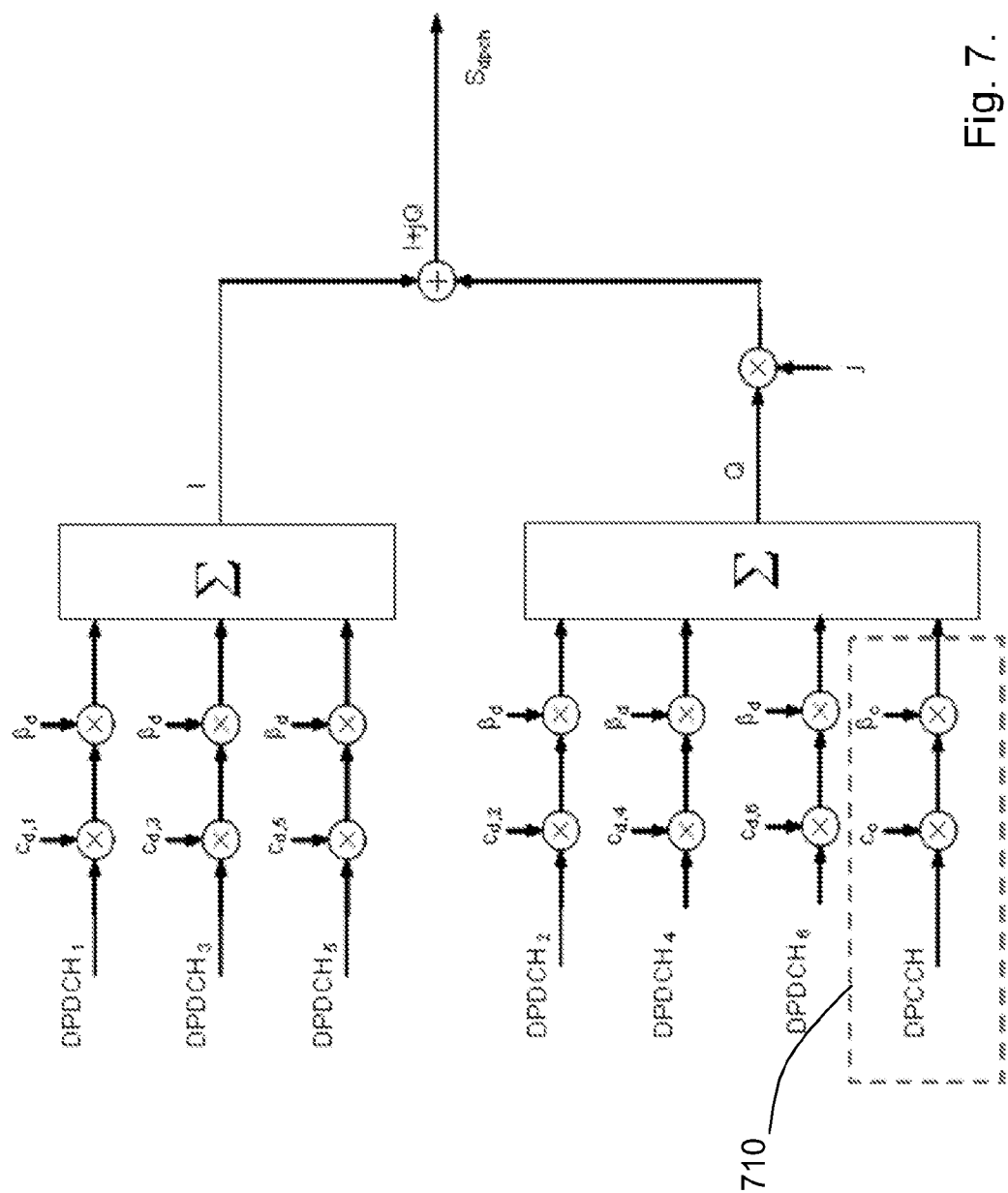
FIG. 7 is a schematic block diagram illustrating embodiments herein.
Figure 8:
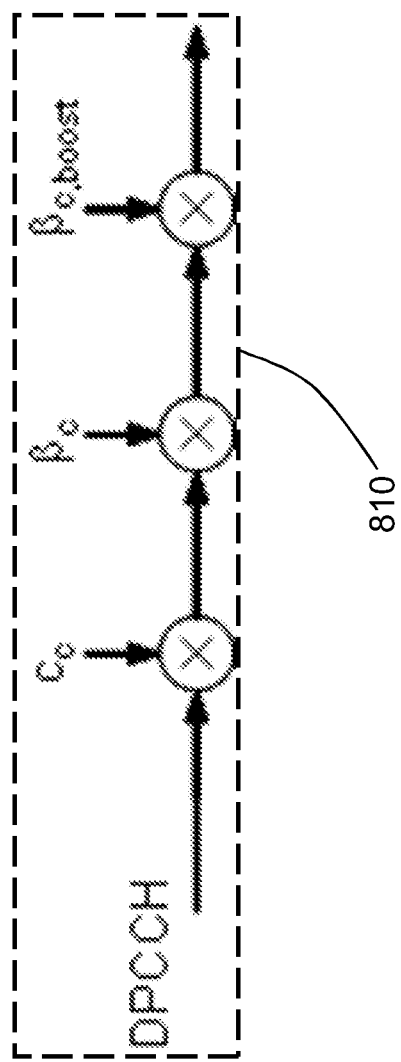
FIG. 8 is a schematic block diagram illustrating embodiments herein.

The user node 120 procedure according to Actions 601-602 above, may, for example, be described as:

Multiply DPCCH by an additional gain factor, denoted e.g. $\beta_{c,boost}$. This is depicted in FIG. 7 disclosing spreading for uplink DPCCH/DPDCHs of prior art according to Section 4.2.1. of 3GPP TS 25.213 version 11.3.0, wherein the dashed part of FIG. 7 representing a DPCCH is replaced by the schematic diagram dashed part in FIG. 8 illustrating an example of a modified DPCCH comprising the additional gain factor $\beta_{c,boost}$ according to $_{embodiments}$ herein. Wherein:

I and Q are traditionally referred to as In-phase and quadrature. In this context the components, such as channels, are mapped to the real part and the Q components, such as channels, are mapped to the imaginary part of the resulting complex-valued signal.

$DPDCH_{1-6}$, There can be up to 6 DPDCHs code-multiplexed, indexed 1-6.

$C_{d,n}$, is the channelization code for the n:th DPDCH.

$\beta d$ is the gain factor for the DPDCH $S_{dpch}$. This is the resulting complex valued signal obtained after I+jQ multiplexing the DPCCH and DPDCH channels.

$C_c$, is the channelization code for the DPCCH, and $\beta c$ is the gain factor for DPCCH.

This additional gain factor is not taken into account in the power normalization step described in 3GPP TS 25.214, version 11.3.0. Let P1 denote the original DPCCH power such as the first power of the DPCCH, after power normalization and TPC adjustment. With the new gain factor, the final DPCCH power such as the second power of the DPCCH will instead be $P_2=\beta^2_{c,boost} \times P_1$, where $P_1$ is the DPCCH power before the power boosting, and $P_2$ is the DPCCH power after the power boosting. $\beta^2_{c,boost}$, the squared $\beta_{c,boost}$ value is the power boosting.

Figure 9:
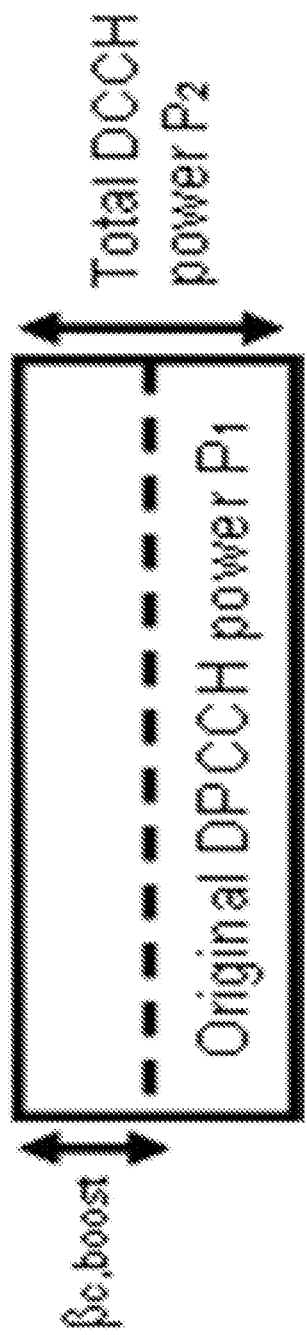
FIG. 9 is a schematic block diagram illustrating embodiments herein.

See also FIG. 9. FIG. 9 shows an example of power of the "virtual" DPCCH such as the second power, compared to the original DPCCH such as the first power.

The power of all other channels such as DPDCH, E-DPCCH, E-DPDCH, HS-DPCCH is, however, still set relative the first power P1, and DPCCH SNR should still be given by the first power P1. The new gain factor $\beta_{c,boost}$ may be seen as a virtual gain factor that only is used for improving the channel estimate, or similarly a virtual DPCCH is transmitted instead of the normal DPCCH and used for channel estimation, whereas the normal DPCCH is used as before for legacy purposes.

The additional gain factor will, however, inevitably affect some legacy procedures. For example, the power scaling procedure may need to take the additional DPCCH power into consideration, and the E-TFC selection procedure needs to take the additional DPCCH power into consideration when determining the blocked states since Normalized Remaining Power Marginal (NRPM) will be affected. The power scaling procedure specifies how to scale the power of the different physical channels whenever the UE is power limited. How this is performed is described in Section 5.1.2.6 in 3GPP 25.214.

The procedure of the network node 110 according to Actions 501-504 above is to use the boosted DPCCH, also referred to as the virtual DPCCH, to get a virtual channel estimate, and then remove the impact of the additional gain value from the virtual channel estimate, i.e. virtual DPCCH, to get the normal channel estimate, i.e. normal DPCCH.

In some embodiments it may be considered to boost all symbols in the DPCCH or only the pilot symbols, see Section 5.2.1.1 of 3GPP TS 25.211 version 11.1.0 for details of the different slot formats for DPCCH.

Instead of introducing an additional $\beta_{c,boost}$ value the existing $\beta c$ may be modified to achieve the same effect.

It is an advantage if the user node 120 and all nodes in the active set have a consistent view of which boosting value that is used. Hence, robust signaling of the boosting value (e.g. $\beta_{c,boost}$) is required. This may, for example, be achieved via higher layer signaling or HS-SCCH orders. See also text related to management below. An active set comprises all cells that a user node is in soft handover with, i.e. each cell in the active set will be part of power controlling the user node and receiving, processing and respond to UL data.

The boosted DPCCH may be managed in different ways and some possibilities, but not restricted to, are listed below. Note that various combinations of the listed ideas are possible.

One way to manage the boosted DPCCH is to allow the network to control it. This may be done in a semi-statically e.g. by using higher-layer signaling, or dynamically e.g. by using HS-SCCH orders. The network node 110 such as an RNC or serving NodeB sends it to the user node 120, the controlling functionality then may comprise, but is not limited to:

Information on when to trigger/release the boosted DPCCH.

Information on how the boosted DPCCH should be transmitted, e.g. continuously, periodically, using a pre-defined pattern or when important information is conveyed.

Information on which beta-values (e.g. $\beta_{c,boost}$) that should be used for the boosted DPCCH.

Information on timer settings, e.g. the duration of boosted DPCCH transmission.

As mentioned above, the criteria for when to enable the boosted DPCCH include, but are not limited to:

Whenever enabled by higher-layers or HS-SCCH orders.

Whenever entering soft handover or whenever entering soft handover involving nodes of different transmit powers, potentially a large imbalance between UL and DL.

Whenever the quality of control channels, e.g. HS-DPCCH or E-DPCCH, becomes bad. Similarly the quality of the E-DPDCH may be used as a trigger. For example, if the serving node such as the network node 110 continuously fails to decode data, it is an indication that the link is poor. Also, if the estimated SIR is well below the SIR target for some time, it is an indication that another node is handling the power control and the own link may be weak.

The functionality may be triggered by the user node 120. For example, the user node 120 notices that the serving cell, or any cell, is retransmitting too much, and hence deduce that the link towards that serving network node 110 is poor. The user node 120 informs an RNC via a new message about this, and the RNC commands the user node 120 to boost the DPCCH. The user node 120 may further inform the NodeBs such as the network node 110 and the second network node 112 about the boosted DPCCH.

The quality of the Relevant UL control channels received in base station such as a NodeB may be sent to the RNC, the serving node, or all other nodes. The communication may take place using a fast backhaul or via the RNC. From this information the RNC, or the serving cell such as the network node 110 may deduce whether boosted DPCCH is needed.

Note that similar or inverted criteria may be used for when to stop using the boosted DPCCH.

The embodiments presented here may be combined with other solutions, e.g. boosting of other channels. Also, the embodiments herein are not only applicable to heterogeneous networks.

Figure 10:
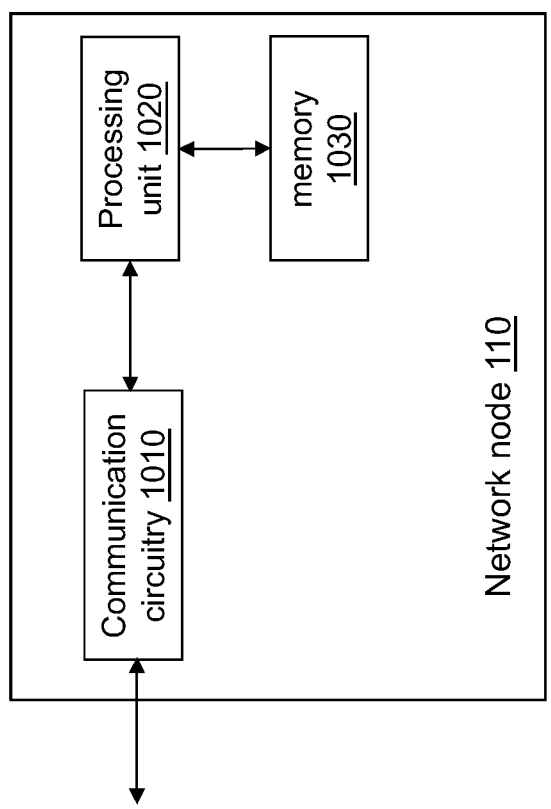
FIG. 10 a schematic block diagram illustrating embodiments herein.

To perform the method actions for enhancing a channel estimate based on a Dedicated Physical Control Channel, DPCCH, between a user node 120 and the network node 110 described above in relation to FIG. 5, the network node 110 comprises the following arrangement depicted in FIG. 10.

The network node 110 is adapted to ensure sufficient channel estimation quality by boosting the DPCCH power. As mentioned above the DPCCH is configured to have a first power. The network node 110 may e.g. be a Node B or an RNC.

The network node 110 comprises a communication circuitry 1010 communication circuitry to communicate with other radio network and core network nodes. The communication circuitry 1010 is configured to receive the DPCCH, wherein the first power of the DPCCH is boosted with additional power, resulting in a second power.

For example, all the symbols of the DPCCH may be boosted with additional power, or only pilot symbols of the DPCCH may be boosted with the additional power.

In some embodiments, the communication circuitry 1010 is arranged to both communicate with other network nodes and to act as radio circuitry. E.g., when the network node 110 is a base station, the communication circuitry 1010 may comprise a radio circuitry to communicate with served user nodes such as the user node 120.

The network node 110 further comprises a processing unit 1020 configured to obtain a channel estimate based on the DPCCH comprising the second power.

The processing unit 1020 is further configured to remove the additional power from the DPCCH based channel estimate as soon as said channel estimate is obtained.

In some embodiments, the DPCCH is multiplied with a first amplitude gain factor resulting in the first power, and the DPCCH is boosted with additional power by being multiplied with an additional amplitude gain factor to the DPCCH resulting in the second power. Or as an alternative, by the first gain factor being modified to further include the additional amplitude gain factor resulting in the second power. In these embodiments, the processing unit 1020 may further be configured to remove the additional power from the DPCCH based channel estimate by removing the additional amplitude gain factor from the DPCCH resulting in the first power.

In some embodiments, the processing unit 1020 is further configured to obtaining an estimate of any other physical channel than the DPCCH by multiplying said channel estimate with said physical channel's gain factor.

The embodiments herein handling the process of enhancing a channel estimate based on a DPCCH between a user node 120 and the network node 110 may be implemented through one or more processors, such as the processing unit 1020 in the network node 110 depicted in FIG. 10, together with computer program code for performing the functions and actions of the embodiments herein. The program code mentioned above may also be provided as a computer program product, for instance in the form of a data carrier carrying computer program code for performing the embodiments herein when being loaded into the in the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 1030 comprising one or more memory units. The memory 1030 is arranged to be used to store, data, configurations, schedulings, and applications to perform the methods herein when being executed in the network node 110.

Those skilled in the art will also appreciate that the communication circuitry 1010, and the radio circuitry described above may refer to a combination of analog and digital circuits, and/or one or more processors configured with software and/or firmware, e.g. stored in the memory 1030, that when executed by the one or more processors such as the processor unit 1020 as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

Figure 11:
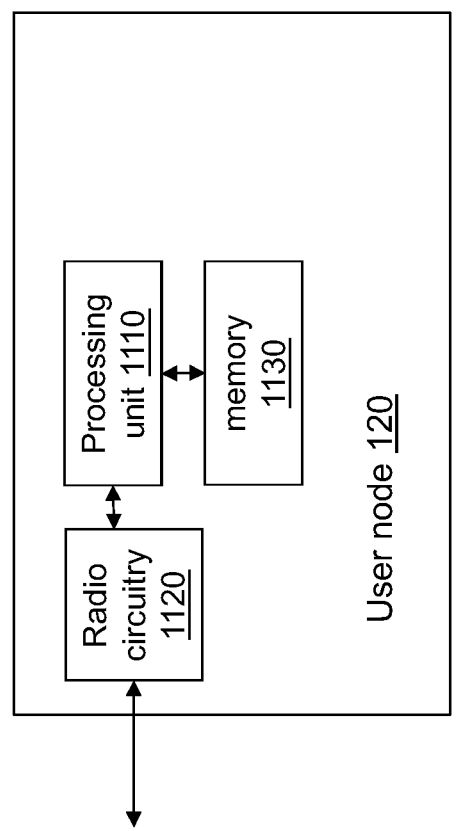
FIG. 11 a schematic block diagram illustrating embodiments herein.

To perform the method actions for enabling enhancement of a channel estimate based on a Dedicated Physical Control Channel, DPCCH, between the user node 120 and a network node 110 described above in relation to FIG. 6, the user node 120, comprises the following arrangement depicted in FIG. 11. As mentioned above the DPCCH is configured to have a first power.

The user node 120 comprises a processing unit 1110 configured to boost the first power of the DPCCH with additional power, resulting in a second power, while keeping the power of other physical channels relative the first power. This enables the network node 110 to obtain a channel estimate based on the DPCCH comprising the second power.

In some embodiments, the DPCCH is multiplied with a first amplitude gain factor resulting in the first power. In these embodiments the processing unit 1110 further is configured to boost the first power of the DPCCH with additional power by multiplying an additional amplitude gain factor to the DPCCH resulting in the second power, or modifying the first gain factor to further include the additional amplitude gain factor resulting in the second power.

Criteria for when to boost the first power of the DPCCH may comprise any one or more out of:

whenever enabled by higher-layers or when receiving High Speed Shared Control CHannel orders, whenever entering soft handover, whenever entering soft handover involving nodes of different transmit powers, whenever a quality of any control channel is below a threshold, whenever an estimated Signal-to-Interference Ratio, SIR, is below a SIR target for a period of time.

The user node 120 further comprises a radio circuitry 1120 to communicate with radio network nodes such as the network node 110. The radio circuitry 1120 is used for sending the UL DPCCH.

The embodiments herein handling the process of for enabling enhancement of a channel estimate based on a DPCCH between the user node 120 and a network node may be implemented through one or more processors, such as a the processing unit 1110 in the user node 120 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the in the user node 120. One such carrier may be in the form of a CD ROM disc. It is however feasible with other data carriers such as a memory stick. The computer program code may furthermore be provided as pure program code on a server and downloaded to the user node 120.

The user node 120 may further comprise a memory 1130 comprising one or more memory units. The memory 1130 is arranged to be used to store data, configurations, schedulings, and applications to perform the methods herein when being executed in the user node 120.

Those skilled in the art will also appreciate that the radio circuitry 1120, described above may refer to a combination of analog and digital circuits, and/or one or more processors configured with software and/or firmware, e.g. stored in the memory 1130, that when executed by the one or more processors such as the processing unit 1110 as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

Various embodiments herein provide methods for boosting the DPCCH power in order to ensure sufficient channel estimation quality when the communication link is weak. Since UL pilots are carried on the DPCCH, boosting of this channel ensures better channel estimation quality.

The ideas presented in this document describe a way to improve the DPCCH quality without affecting the power settings of other channels that are set relative to the DPCCH. The boosted DPCCH may be managed dynamically or semi-statically and has a minimal impact on legacy user nodes.

The network node 110 may also be a user node, such as the user node 120, a telemetry node, a communication node in a car, or any type of node communicating in a radio network system.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a network node for enhancing a channel estimate based on a Dedicated Physical Control Channel, DPCCH, between a user node and the network node, wherein the DPCCH has a first power, the method comprising:
   receiving the DPCCH, which first power of the DPCCH is boosted with additional power, resulting in a second power,
   obtaining a channel estimate based on the DPCCH comprising the second power, and
   removing the additional power from the DPCCH based channel estimate as soon as said channel estimate is obtained.

2. The method according to claim 1, wherein the DPCCH is multiplied with a first amplitude gain factor resulting in the first power, and wherein the DPCCH is boosted with additional power by one of being multiplied with an additional amplitude gain factor to the DPCCH resulting in the second power and the first gain factor being modified to further include the additional amplitude gain factor resulting in the second power, and wherein the removing the additional power from the DPCCH based channel estimate is performed by:
   removing the additional amplitude gain factor from the DPCCH resulting in the first power.

3. The method according to claim 2, further comprising obtaining an estimate of any other physical channel than the DPCCH by multiplying said channel estimate with said physical channel's gain factor.

4. The method according to claim 2, wherein one of all symbols of the DPCCH and only pilot symbols of the DPCCH are boosted with the additional power.

5. The method according to claim 1, further comprising:
   obtaining an estimate of any other physical channel than the DPCCH by multiplying said channel estimate with said physical channel's gain factor.

6. The method according to claim 1, wherein one of all symbols of the DPCCH and only pilot symbols of the DPCCH are boosted with the additional power.

7. A method in a user node for enabling enhancement of a channel estimate based on a Dedicated Physical Control Channel, DPCCH, between the user node and a network node, wherein the DPCCH has a first power, the method comprising:
   boosting the first power of the DPCCH with additional power, resulting in a second power, while keeping the power of other physical channels relative the first power, enabling the network node to obtain a channel estimate based on the DPCCH comprising the second power.

8. The method according to claim 7, wherein the DPCCH is multiplied with a first amplitude gain factor resulting in the first power, and wherein the boosting of the first power of the DPCCH is performed by one of:
   multiplying an additional amplitude gain factor to the DPCCH resulting in the second power and
   modifying the first gain factor to further include the additional amplitude gain factor resulting in the second power.

9. The method according to claim 8, wherein a criteria for when to perform the boosting of the first power of the DPCCH comprises at least one of:
   whenever enabled by higher-layers,
   when receiving High Speed Shared Control Channel orders,
   whenever entering soft handover,
   whenever entering soft handover involving nodes of different transmit powers,
   whenever a quality of any control channel is below a threshold,
   whenever an estimated Signal-to-Interference Ratio, SIR, is below a SIR target for a period of time.

10. The method according to claim 7, wherein a criteria for when to perform the boosting of the first power of the DPCCH comprises at least one of:
    whenever enabled by higher-layers,
    when receiving High Speed Shared Control Channel orders,
    whenever entering soft handover,
    whenever entering soft handover involving nodes of different transmit powers,
    whenever a quality of any control channel is below a threshold, and
    whenever an estimated Signal-to-Interference Ratio, SIR, is below a SIR target for a period of time.

11. A network node for enhancing a channel estimate based on a Dedicated Physical Control Channel, DPCCH, between a user node and the network node, wherein the DPCCH is configured to have a first power, the network node comprising:
    a communication circuitry configured to receive the DPCCH, which first power of the DPCCH is boosted with additional power, resulting in a second power,
    a processing unit configured to obtain a channel estimate based on the DPCCH comprising the second power, and
    which processing unit further is configured to remove the additional power from the DPCCH based channel estimate as soon as said channel estimate is obtained.

12. The network node according to claim 11, wherein the DPCCH is multiplied with a first amplitude gain factor resulting in the first power, and wherein the DPCCH is boosted with additional power by one of being multiplied with an additional amplitude gain factor to the DPCCH resulting in the second power and the first gain factor being modified to further include the additional amplitude gain factor resulting in the second power, and wherein the processing unit is further configured to remove the additional power from the DPCCH based channel estimate by removing the additional amplitude gain factor from the DPCCH resulting in the first power.

13. The network node according to claim 12, wherein the processing unit is further configured to obtain an estimate of any other physical channel than the DPCCH by multiplying said channel estimate with said physical channel's gain factor.

14. The network node according to claim 12, wherein one of all symbols of the DPCCH and only pilot symbols of the DPCCH are boosted with the additional power.

15. The network node according to claim 11, wherein the processing unit is further configured to obtain an estimate of any other physical channel than the DPCCH by multiplying said channel estimate with said physical channel's gain factor.

16. The network node according to claim 11, wherein one of all symbols of the DPCCH and only pilot symbols of the DPCCH are boosted with the additional power.

17. A user node for enabling enhancement of a channel estimate based on a Dedicated Physical Control Channel, DPCCH, between the user node and a network node, wherein the DPCCH is configured to have a first power, the user node comprising:
  a processing unit configured to boost the first power of the DPCCH with additional power, resulting in a second power, while keeping the power of other physical channels relative the first power, enabling the network node to obtain a channel estimate based on the DPCCH comprising the second power.

18. The method according to claim 17, wherein the DPCCH is multiplied with a first amplitude gain factor resulting in the first power, and wherein the processing unit is further configured to boost the first power of the DPCCH with additional power by one of:
  multiplying an additional amplitude gain factor to the DPCCH resulting in the second power and
  modifying the first gain factor to further include the additional amplitude gain factor resulting in the second power.

19. The method according to claim 17, wherein a criteria for when to boost the first power of the DPCCH comprises at least one of:
  whenever enabled by higher-layers,
  when receiving High Speed Shared Control Channel orders,
  whenever entering soft handover,
  whenever entering soft handover involving nodes of different transmit powers,
  whenever a quality of any control channel is below a threshold, and
  whenever an estimated Signal-to-Interference Ratio, SIR, is below a SIR target for a period of time.

20. The method according to claim 18, wherein a criteria for when to boost the first power of the DPCCH comprises at least one of:
  whenever enabled by higher-layers,
  when receiving High Speed Shared Control Channel orders,
  whenever entering soft handover,
  whenever entering soft handover involving nodes of different transmit powers,
  whenever a quality of any control channel is below a threshold, and
  whenever an estimated Signal-to-Interference Ratio, SIR, is below a SIR target for a period of time.

* * * * *

UNITED STATES PATENT AND TRADEMARK OFFICE
CERTIFICATE OF CORRECTION

PATENT NO.      : 9,198,104 B2
APPLICATION NO. : 13/983714
DATED           : November 24, 2015
INVENTOR(S)     : Larsson et al.

It is certified that error appears in the above-identified patent and that said Letters Patent is hereby corrected as shown below:

In The Specification

In Column 10, Line 67, delete "part" and insert -- part 710 --, therefor.

In Column 11, Line 2, delete "part" and insert -- part 810 --, therefor.

In Column 14, Line 46, delete "may" and insert -- 110 may --, therefor.

In The Claims

In Column 17, Line 34, in Claim 18, delete "method" and insert -- user node --, therefor.

In Column 18, Line 9, in Claim 19, delete "method" and insert -- user node --, therefor.

In Column 18, Line 22, in Claim 20, delete "method" and insert -- user node --, therefor.

Signed and Sealed this
Fifth Day of July, 2016

Michelle K. Lee
*Director of the United States Patent and Trademark Office*